(12) United States Patent
Santoski

(10) Patent No.: US 7,077,420 B1
(45) Date of Patent: Jul. 18, 2006

(54) FOLDABLE THREE-WHEELED JOGGING STROLLER

(75) Inventor: Paul Santoski, Boulder, CO (US)

(73) Assignee: American Recreation Products, Inc., St. Louis, MO (US)

( * ) Notice: Subject to any disclaimer, the term of this patent is extended or adjusted under 35 U.S.C. 154(b) by 0 days.

(21) Appl. No.: 11/051,126

(22) Filed: Feb. 4, 2005

(51) Int. Cl.
*B62B 7/06* (2006.01)

(52) U.S. Cl. ............... 280/642; 280/647; 280/639; 74/63

(58) Field of Classification Search ............... 280/642, 280/639, 638, 647; D12/129; 74/63; 474/4, 474/148, 150
See application file for complete search history.

(56) References Cited

U.S. PATENT DOCUMENTS

| | | | |
|---|---|---|---|
| 1,788,102 A * | 1/1931 | Gilbert | 403/100 |
| 2,455,119 A | 11/1948 | Hall | |
| 2,471,462 A | 5/1949 | Toth | |
| 2,494,199 A | 1/1950 | Provitola et al. | |
| 2,672,348 A | 3/1954 | Scott | |
| 3,390,893 A | 7/1968 | MacLaren | |
| 3,563,592 A | 2/1971 | Preston | |
| 3,836,164 A | 9/1974 | Sugino et al. | |
| 3,936,069 A | 2/1976 | Giordani | |
| 3,995,882 A | 12/1976 | Watkins | |
| 4,072,318 A | 2/1978 | Laune | |
| 4,077,641 A | 3/1978 | Perego | |
| 4,118,052 A | 10/1978 | Cabagnero | |
| 4,132,429 A | 1/1979 | Woods | |
| 4,266,807 A | 5/1981 | Griffin | |
| 4,462,607 A | 7/1984 | Nakao et al. | |
| 4,544,178 A * | 10/1985 | Al-Sheikh et al. | 280/642 |
| 4,614,454 A | 9/1986 | Kassai | |
| 4,640,519 A | 2/1987 | Bigo | |
| 4,750,231 A * | 6/1988 | Kogashiwa | 15/97.1 |
| D297,525 S | 9/1988 | Baechler | |
| 4,934,728 A | 6/1990 | Chen | |
| 4,953,880 A | 9/1990 | Sudakoff et al. | |
| D315,885 S | 4/1991 | Jacobs | |
| 5,029,891 A | 7/1991 | Jacobs | |
| 5,123,670 A | 6/1992 | Chen | |
| 5,184,835 A * | 2/1993 | Huang | 280/47.371 |
| 5,188,389 A | 2/1993 | Baechler et al. | |
| 5,224,720 A | 7/1993 | Chaw et al. | |
| 5,234,224 A | 8/1993 | Kim | |
| 5,240,265 A | 8/1993 | Huang | |
| 5,299,825 A | 4/1994 | Smith | |
| 5,318,318 A | 6/1994 | Berner et al. | |
| D350,923 S | 9/1994 | Schmidlin et al. | |

(Continued)

OTHER PUBLICATIONS

Kelty Strollers, Kelty Spring 2004 Workbook, pp. 41-42, Kelty USA, admitted prior art.

*Primary Examiner*—Christopher P. Ellis
*Assistant Examiner*—John Walters
(74) *Attorney, Agent, or Firm*—Senniger Powers

(57) ABSTRACT

A three-wheeled jogging stroller is movable between a deployed condition and a folded condition. Among other features, the stroller includes a forward member, a rear member, and a handle member that is rotatable to move the stroller from the deployed condition to the folded condition and back again. A locking side brace extends between the respective legs of the rear member and the forward member. Pulleys are attached to certain of the forward member, rear member and handle member. The stroller also includes first and second cables, and each cable is wrapped partially around and attached to at least one of the pulleys.

19 Claims, 15 Drawing Sheets

U.S. PATENT DOCUMENTS

| | | |
|---|---|---|
| 5,356,171 A | 10/1994 | Schmidlin et al. |
| 5,364,119 A | 11/1994 | Leu |
| D356,760 S | 3/1995 | Baechler |
| D357,890 S | 5/1995 | Eyman et al. |
| 5,460,399 A | 10/1995 | Baechler et al. |
| 5,468,009 A | 11/1995 | Eyman et al. |
| 5,476,275 A | 12/1995 | Baechler et al. |
| 5,511,441 A | 4/1996 | Arai |
| D369,579 S | 5/1996 | Baechler |
| D370,438 S | 6/1996 | Haut et al. |
| D371,094 S | 6/1996 | Hinkston |
| 5,522,614 A * | 6/1996 | Eyman et al. ............... 280/642 |
| 5,536,033 A | 7/1996 | Hinkston |
| 5,558,357 A | 9/1996 | Wang |
| 5,562,300 A | 10/1996 | Nelson |
| 5,590,896 A | 1/1997 | Eichhorn |
| 5,611,560 A | 3/1997 | Thimmig |
| 5,622,375 A * | 4/1997 | Fairclough ................. 280/642 |
| D381,297 S | 7/1997 | Eyman et al. |
| 5,647,601 A | 7/1997 | Potter et al. |
| 5,660,435 A | 8/1997 | Eichhorn |
| 5,669,624 A | 9/1997 | Eichhorn |
| D385,514 S | 10/1997 | Eyman et al. |
| 5,683,096 A | 11/1997 | Zonka |
| 5,695,212 A | 12/1997 | Hinkston |
| 5,743,552 A | 4/1998 | Baechler et al. |
| 5,755,455 A | 5/1998 | Chen et al. |
| 5,765,855 A | 6/1998 | Chiu |
| 5,765,856 A | 6/1998 | Kiser |
| 5,845,925 A | 12/1998 | Huang |
| 5,863,061 A | 1/1999 | Ziegler et al. |
| 5,887,889 A | 3/1999 | Andrus |
| 5,947,552 A | 9/1999 | Wilkins et al. |
| 5,975,559 A | 11/1999 | Zonka |
| 6,017,051 A | 1/2000 | Thimmig |
| 6,036,220 A | 3/2000 | Zhen |
| 6,053,525 A | 4/2000 | Lin |
| D426,176 S | 6/2000 | Sutherland et al. |
| 6,095,548 A * | 8/2000 | Baechler .................... 280/650 |
| 6,102,431 A * | 8/2000 | Sutherland et al. ......... 280/642 |
| 6,105,998 A | 8/2000 | Baechler et al. |
| D431,940 S | 10/2000 | Brown et al. |
| 6,152,476 A | 11/2000 | Huang |
| 6,170,615 B1 | 1/2001 | Cheng |
| 6,196,572 B1 | 3/2001 | Durrin |
| 6,209,892 B1 | 4/2001 | Schaaf et al. |
| 6,267,405 B1 | 7/2001 | Chen |
| 6,276,759 B1 | 8/2001 | Lan |
| 6,299,194 B1 * | 10/2001 | Chen ......................... 280/642 |
| 6,302,613 B1 | 10/2001 | Lan |
| 6,312,005 B1 * | 11/2001 | Lin ............................ 280/647 |
| 6,315,309 B1 | 11/2001 | Li et al. |
| 6,318,750 B1 | 11/2001 | Lan |
| 6,325,406 B1 | 12/2001 | O'Shea et al. |
| 6,422,587 B1 | 7/2002 | Yamazaki et al. |
| 6,443,468 B1 | 9/2002 | Eros |
| 6,464,242 B1 | 10/2002 | Suzuki |
| 6,478,328 B1 | 11/2002 | Yeh et al. |
| 6,485,216 B1 | 11/2002 | Cheng |
| 6,533,309 B1 | 3/2003 | Lin |
| 6,533,310 B1 | 3/2003 | O'Shea et al. |
| 6,550,801 B1 | 4/2003 | Newhard |
| 6,550,802 B1 | 4/2003 | Sheehan |
| 6,561,536 B1 | 5/2003 | Suzuki |
| 6,663,122 B1 | 12/2003 | Lin |
| D486,427 S | 2/2004 | Garza |
| 6,722,689 B1 | 4/2004 | Kreamer |
| 6,739,616 B1 * | 5/2004 | Lin ............................ 280/642 |
| 6,742,791 B1 | 6/2004 | Lan |
| 6,767,028 B1 | 7/2004 | Britton et al. |
| 2002/0041083 A1 | 4/2002 | Britton et al. |
| 2002/0050700 A1 | 5/2002 | Stohr et al. |
| 2002/0093177 A1 | 7/2002 | Chen |
| 2003/0057681 A1 | 3/2003 | Lan |
| 2003/0085551 A1 * | 5/2003 | Allen et al. ................. 280/642 |
| 2003/0102654 A1 | 6/2003 | Shapiro |
| 2003/0155745 A1 | 8/2003 | Everett |
| 2003/0193172 A1 | 10/2003 | Lin |
| 2004/0041367 A1 | 3/2004 | Everett |
| 2004/0227330 A1 * | 11/2004 | Everett ....................... 280/642 |

* cited by examiner

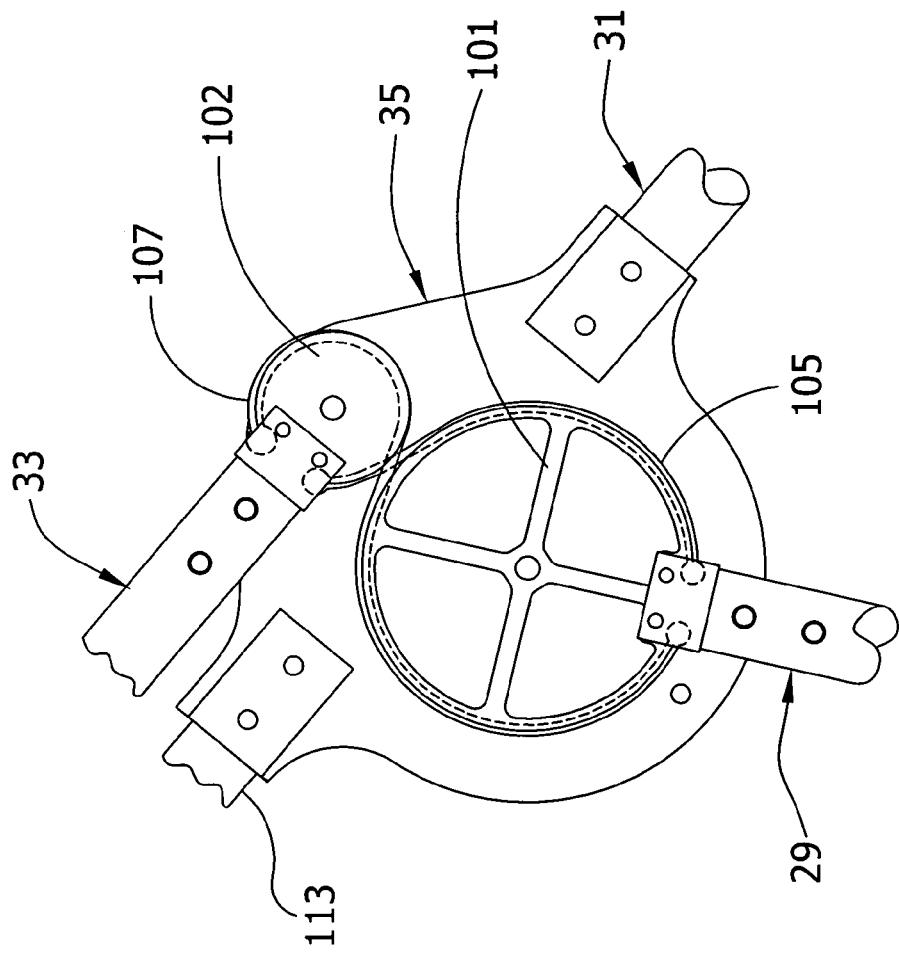

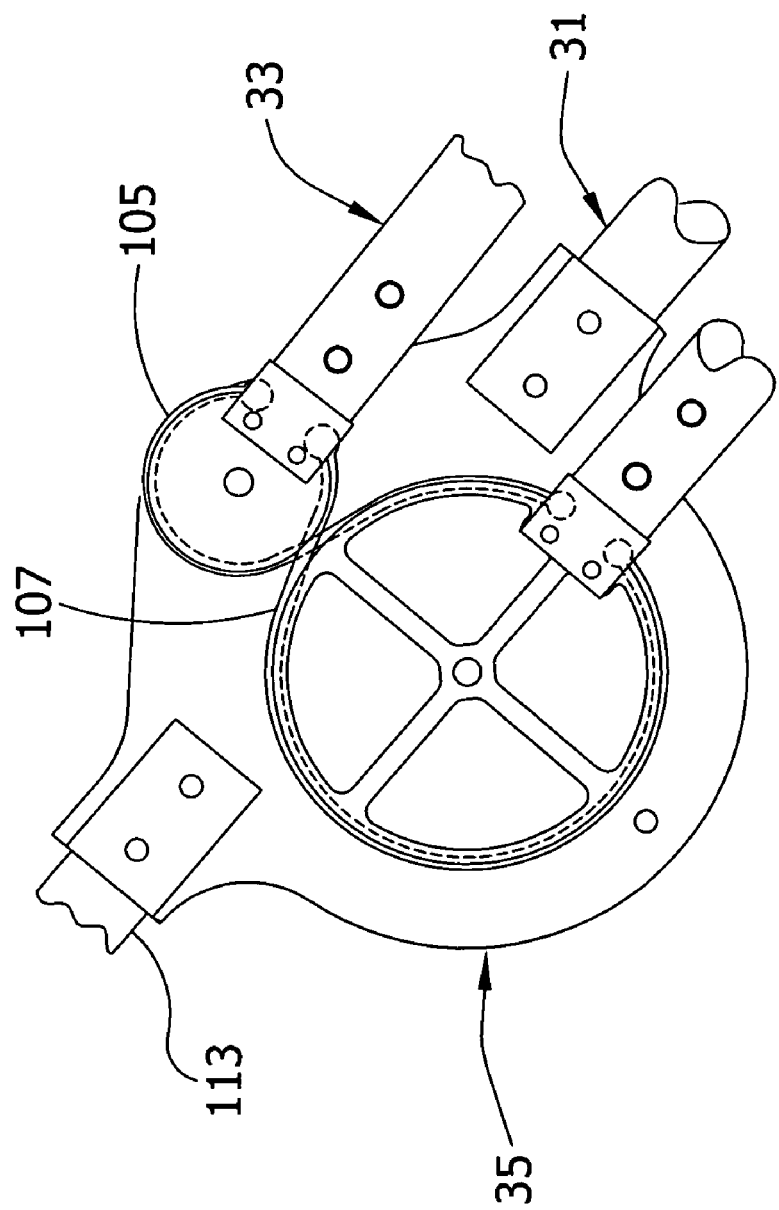

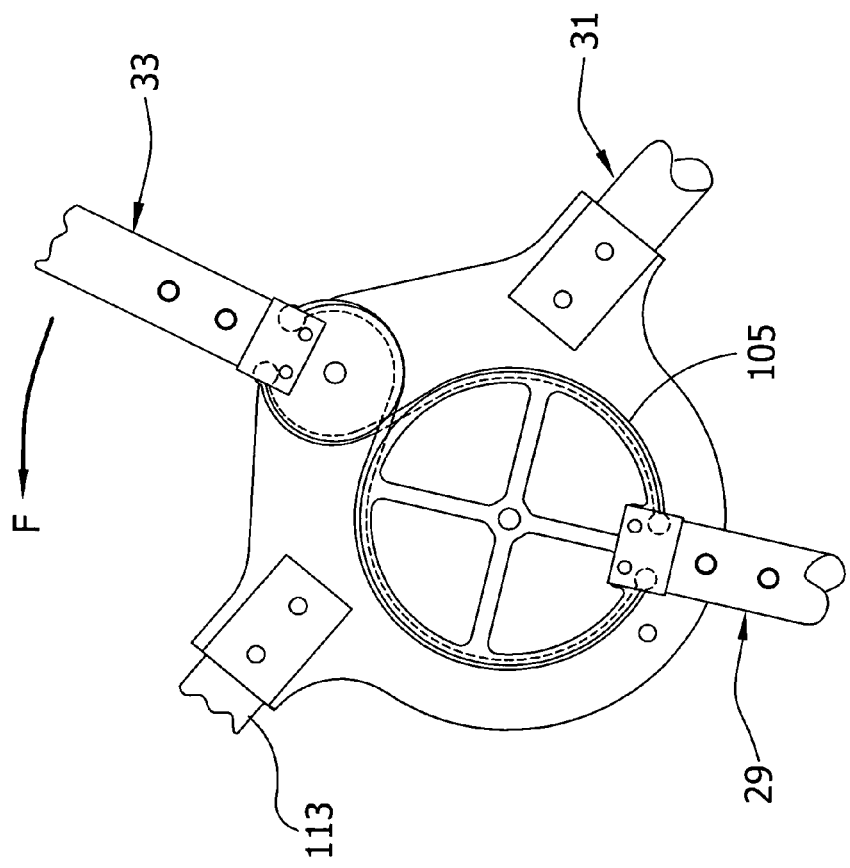

FOLDABLE THREE-WHEELED JOGGING STROLLER

BACKGROUND OF THE INVENTION

The present invention relates generally to a stroller for transporting a child and more particularly to a foldable three-wheeled jogging stroller.

SUMMARY OF THE INVENTION

Briefly, one aspect of this invention is directed to a three-wheeled jogging stroller movable between a deployed condition and a folded condition. The stroller comprises a single front wheel and two rear wheels. A forward member has two spaced-apart legs and includes a fork rotatably mounting the front wheel. A rear member has two spaced-apart legs, a lower end of each leg including two spaced-apart lower mounts for rotatably mounting the two rear wheels. A handle member extends upward and rearward from adjacent the upper end of the forward member. The handle member is rotatable to move the stroller from the deployed condition to the folded condition and back again. A flexible seat is secured over at least one of the handle member and the forward member. A locking side brace extends between the respective legs of the rear member and the forward member. The brace is movable between a locked position for locking and stabilizing the stroller in the deployed condition and an unlocked position for allowing motion of the stroller from the deployed condition to the folded condition. The stroller further comprises first and second pulleys, each pulley being attached to one of the forward member, rear member and handle member. The stroller also comprises first and second cables, and each cable is wrapped partially around and attached to at least one of the pulleys. The pulleys and cables are arranged to cause motion toward the folded position of at least one of the forward and rear members upon rotation of the handle member in a first direction toward the folded position so that the stroller moves from the deployed condition to the folded condition by forward rotation of the handle member. The pulleys and cables are further arranged to cause motion toward the deployed position of at least one of the forward and rear members upon rotation of the handle member in a second direction toward the deployed position so that the stroller moves from the folded condition to the deployed condition by rotation of the handle member. The brace includes left and right rear elements connected to the rear member, and includes a C-shaped element that is pivotally connected to the forward member so that a central section of the C-shaped element extends laterally between the legs of the forward member under the seat area.

In another aspect, the three-wheeled jogging stroller comprises a frame mounting the wheels and a seat. The frame includes a right side housing and a left side housing. A forward member has spaced-apart legs fixed to each of the housings at an upper end and rotatably mounts the front wheel at an opposite end. A rear member includes first pulleys at right and left upper ends rotatably connected to respective housings, and spaced-apart lower mounts at right and left lower ends for rotatably mounting the two rear wheels. A handle member includes second pulleys at right and left lower ends rotatably connected to respective housings. The handle member is rotatable about the housing to move the stroller from the deployed condition to the folded condition. The frame also comprises first and second cables, each cable being wrapped partially around and attached to at least one of the pulleys. An over-center locking side brace extends between the rear member and the forward member and is movable between a locked position for locking and strengthening the stroller in the deployed condition and an unlocked position for allowing motion of the stroller from the deployed condition to the folded condition. The brace includes a rigid beam extending laterally between the legs of the forward member. The pulleys and cables are arranged to cause motion of the rear member upon rotation of the handle member toward the folded position so that the stroller moves from the deployed condition to the folded condition by forward rotation of the handle member. The pulleys and cables are further arranged to cause motion toward the deployed position of the rear member upon rotation of the handle member toward the deployed position so that the stroller moves from the folded condition to the deployed condition by rotation of the handle member.

Other features of the present invention will be in part apparent and in part pointed out hereinafter.

BRIEF DESCRIPTION OF THE DRAWINGS

FIGS. 12–13 are a progression of views like FIG. 11 but showing the cable/pulley arrangement moving to the folded condition; and FIG. 14 is similar to FIG. 12 but shows the cable/pulley arrangement moving back toward the deployed condition.

Corresponding reference characters indicate corresponding parts throughout the several views of the drawings.

DETAILED DESCRIPTION OF THE PREFERRED EMBODIMENT

Figure 1:
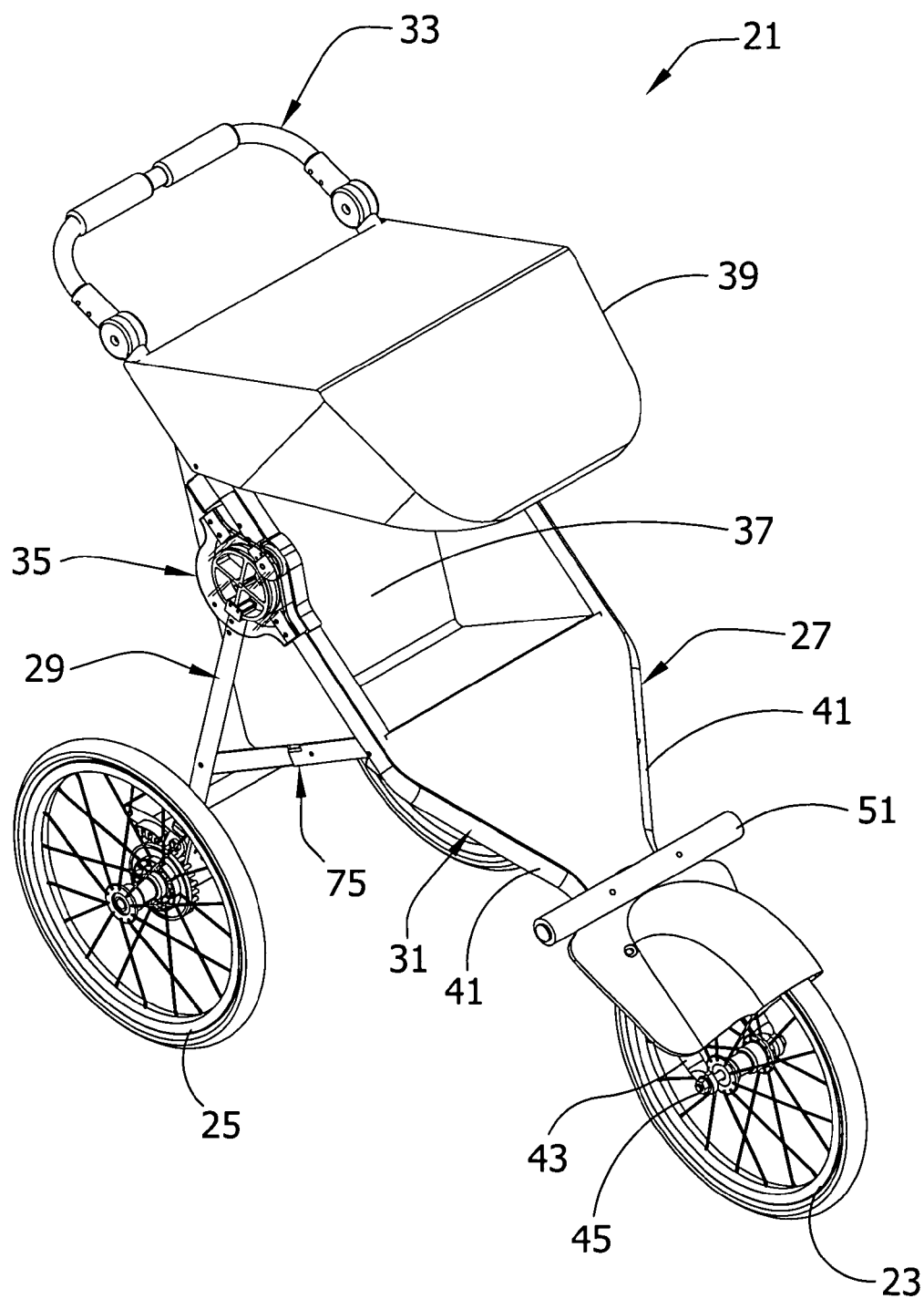
FIG. 1 is a perspective view of a stroller of one embodiment of the invention.
Figure 2:
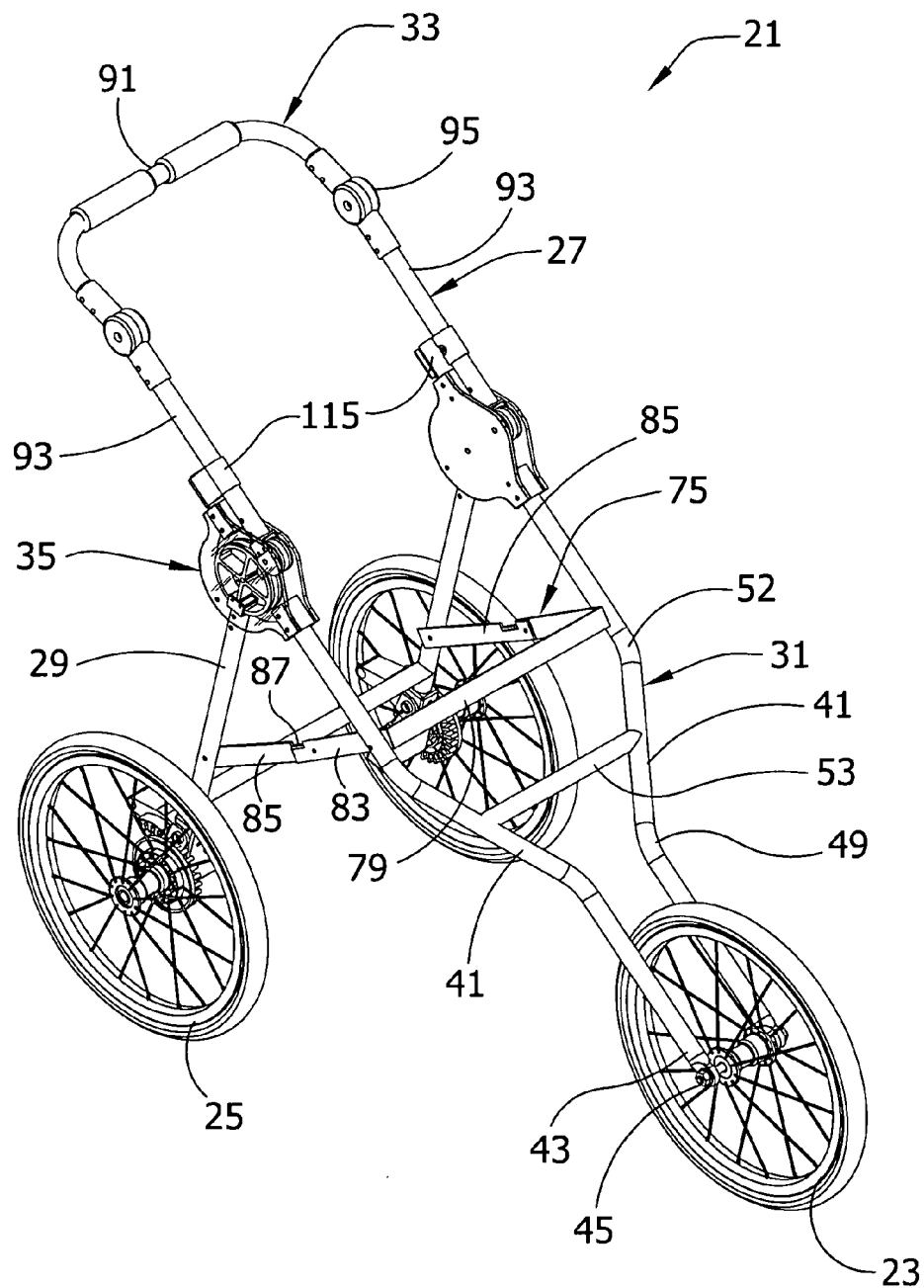
FIG. 2 is a perspective view of the stroller of FIG. 1 but with the seat and other accessories omitted.
Figure 3:
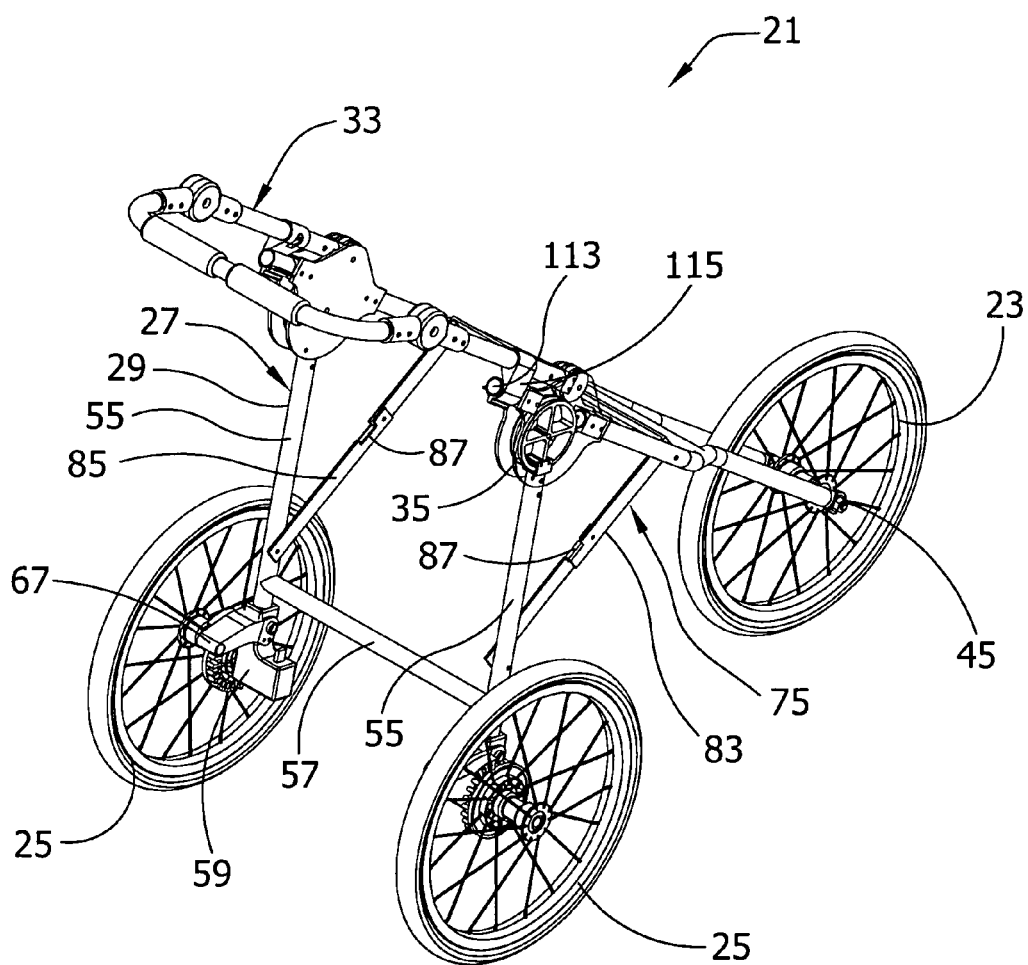
FIG. 3 is another perspective view showing the rear of the stroller of FIG. 2.

Referring now to the drawings and in particular to FIGS. 1–3, a stroller of the present invention is generally designated 21. The stroller 21 generally comprises a single front wheel 23 and two rear wheels 25, and a frame 27 generally comprising a rear member 29, a forward member 31, and a handle member 33, all of these frame members being joined to a central housing 35 of the frame. In this embodiment, a fabric seat 37 is secured over portions of the handle member 33 and the forward member 31, and a retractable, adjustable hood 39 is also attached to the handle member.

The forward member 31 includes two spaced-apart legs 41 and a fork 43 formed by forward ends of the two legs for receiving and supporting the front wheel 23. The front wheel 23 is conventional and is secured to the fork 43 by nuts 45, or by other suitable fasteners such as quick release fasteners. The forward member 31 generally extends upward and rearward from the front wheel 23 to its connection with the housing 35 of the frame 27. The legs 41 are bent outward at a first bend 49 disposed just behind the front wheel 23 (FIG. 2). A foot rest bar 51 is mounted (as by welding) on the forward member 31 at the first bend 49 (FIG. 1), extending transverse to the legs 41. The legs 41 extend linearly outward from the first bend 49 to a second bend 52 just below the seat. A bar 53 (FIG. 2) extends between the legs 41 between the first and second bends 49, 52, and is fixed thereto, e.g. by welding.

Figure 4:
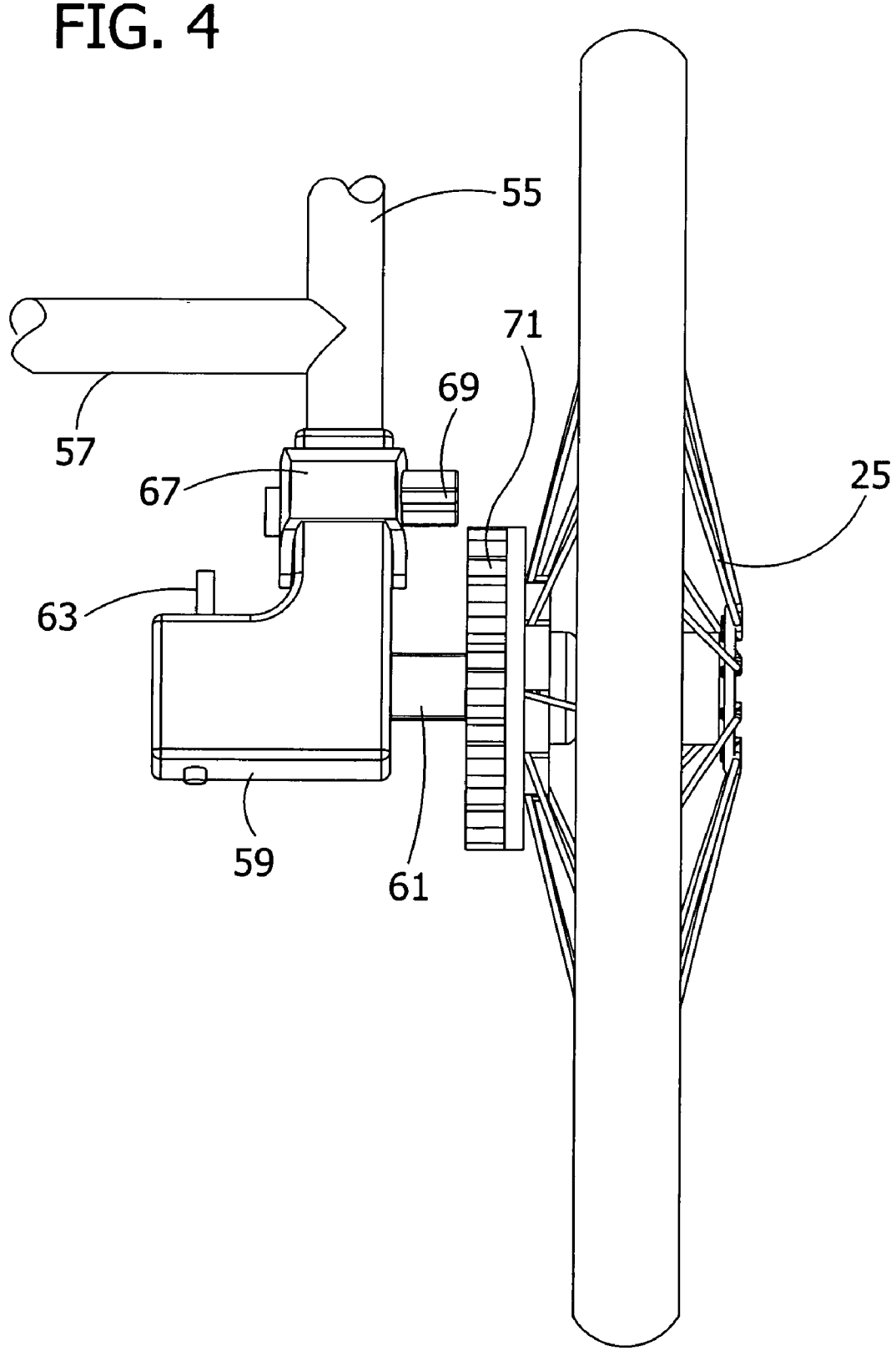
FIG. 4 is an enlarged fragmentary rear view of the stroller.

Referring to FIGS. 3–4, the rear member 29 is U-shaped, having two spaced-apart legs 55 joined by a support 57 adjacent their lower ends. Two bearings 59 (broadly, "mounts") are attached to the respective lower ends of the legs 55 for rotatably mounting and supporting the two rear wheels 25. Each rear wheel 25 includes an axle 61 (FIG. 4) receivable in one of the bearings 59. The bearing 59 includes a suitable lock mechanism, such as a spring-biased lock 63, for releasably securing the axle 61 in the bearing. Thus, the wheels 25 can be removed for more compact storage of the stroller 21 by depressing the lock 63 (the wheel is shown partially removed in FIG. 4). A pivotable brake lever 67 mounted on each bearing 59 includes teeth 69 for engaging mating teeth 71 on the rear wheel hubs. The brake lever 67 is pivoted down into engagement with the teeth 71 to lock the rear wheels 25.

Referring again to FIGS. 2–3, the frame 27 also comprises an over-center, locking side brace 75 (also referred to as a "ladder-style" brace) or hinged side brace extending between the rear member 29 and the forward member 31. The brace 75 includes a C-shaped element having a beam 79 extending laterally between the legs 41 of the forward member 31 and disposed slightly above the second bend 52. The beam 79 of the C-shaped element is suitably covered by a foam cushion (not shown).

Arms 83 of the C-shaped element extend rearward from the beam 79 at 90° angles therefrom and are pivotally connected to the forward member 31. The brace 75 includes left and right rear elements 85, each being pivotally connected at one end to the rear member 29 and at the other end to a respective arm of the C-shaped element. The rear elements 85 are connected to the respective arms 83 by rivets or other suitable fasteners. The rear elements 85 and arms 83 overlap one another, and a stop or tab 87 extends outward from each of the rear elements over the arms to engage the arms in the over-center position. The tabs 87 thereby limit the motion of the elements 85 when they are moving to the over-center position. In this position, the brace 75 serves to stabilize the stroller frame 27.

The handle member 33 generally extends upward and rearward from the housing 35 and from adjacent the upper end of the forward and rear members 31, 29. An upper portion of the handle member is adjustable relative to a lower portion of the handle member. In this embodiment, the upper portion is a C-shaped handlebar 91, and the lower portion includes two spaced-apart arms 93 extending from ends of the handlebar. A suitable angle adjustment mechanism, e.g. a conventional button-type angle adjuster 95 as shown, forms the junction between the arms 93 and the handlebar 91. The user can depress the buttons and adjust the angle of the handlebar 91.

Figure 5:
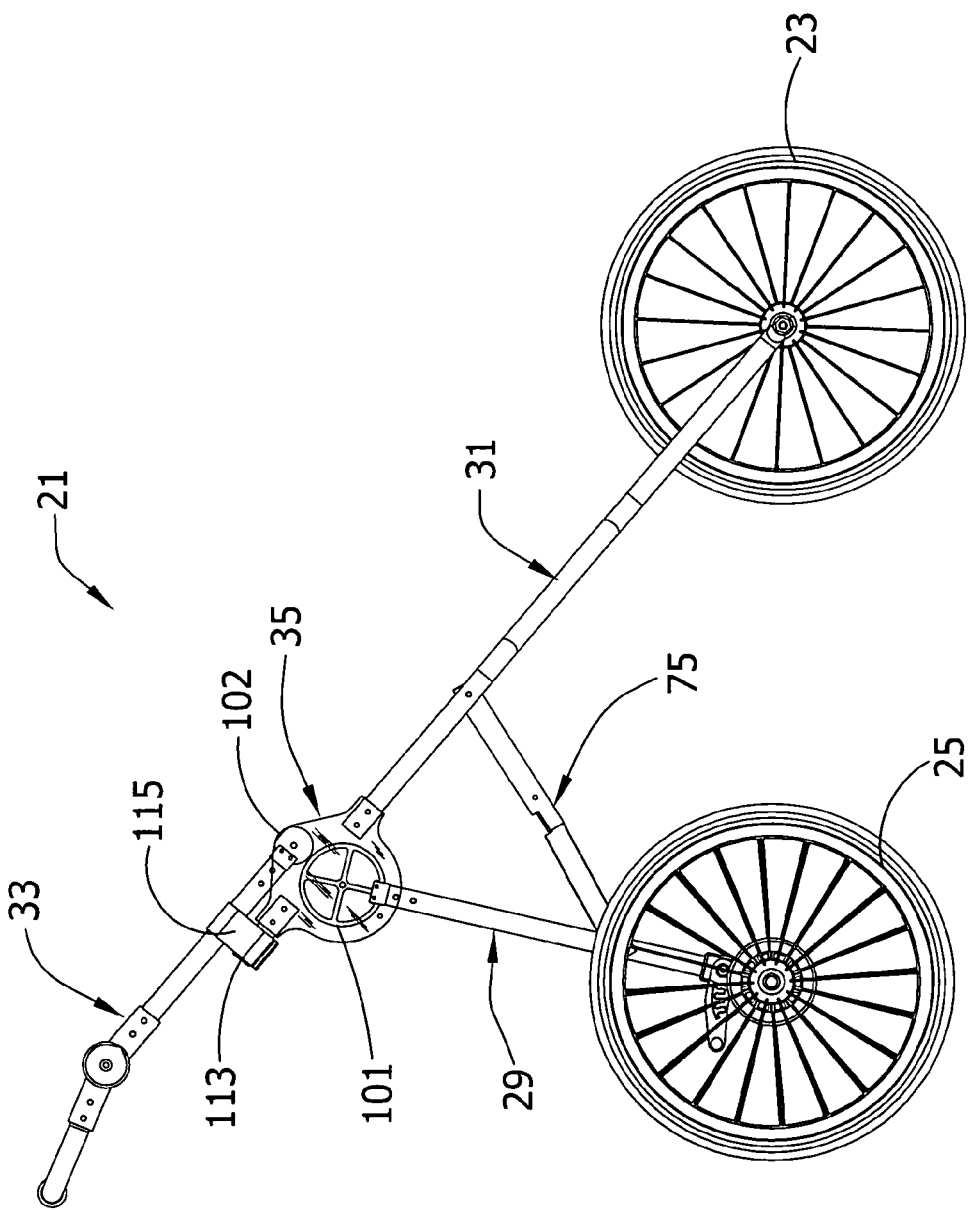
FIG. 5 is a side view of the stroller.
Figure 11A:
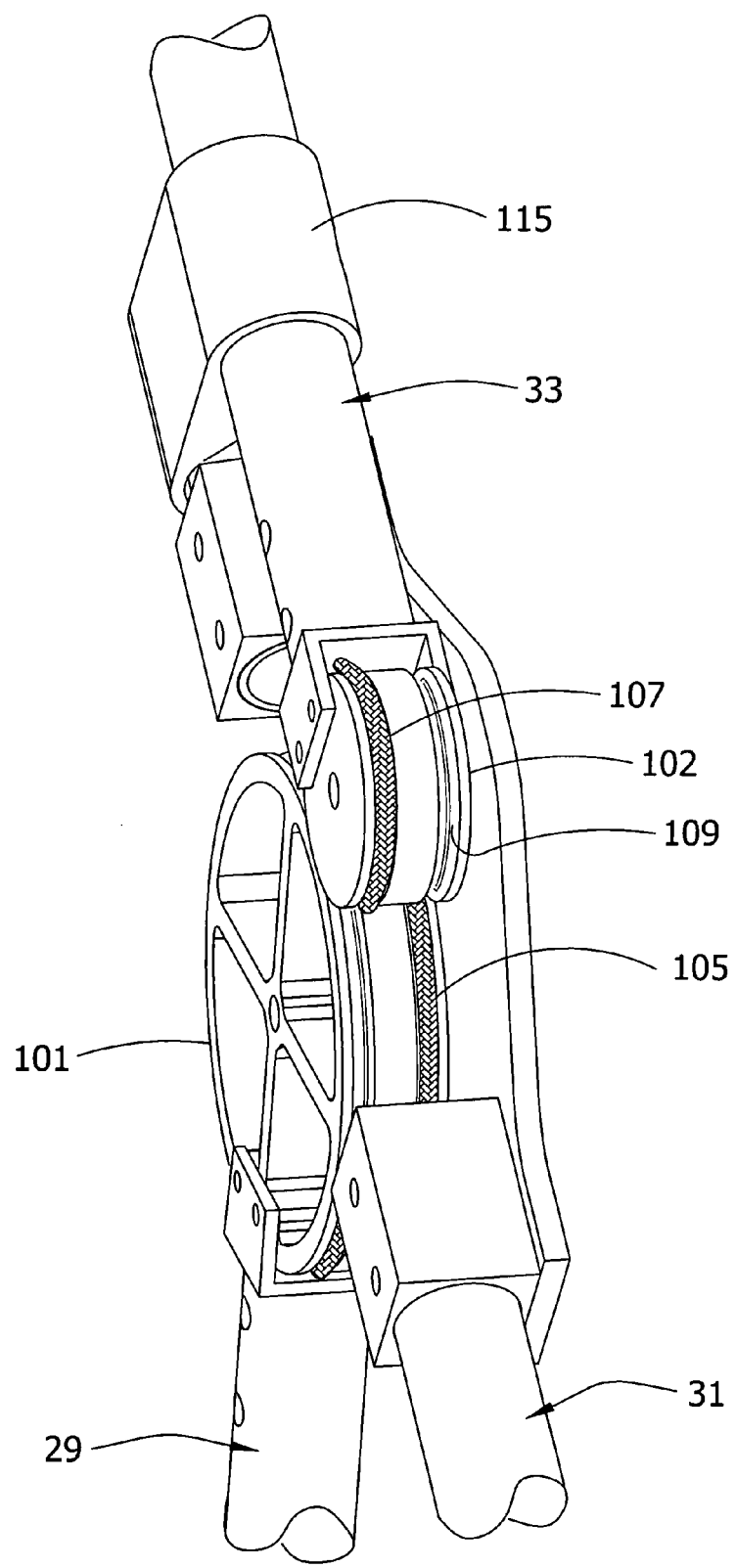
FIG. 11 is an enlarged fragmentary view of a cable/pulley arrangement of the stroller.
Figure 12:
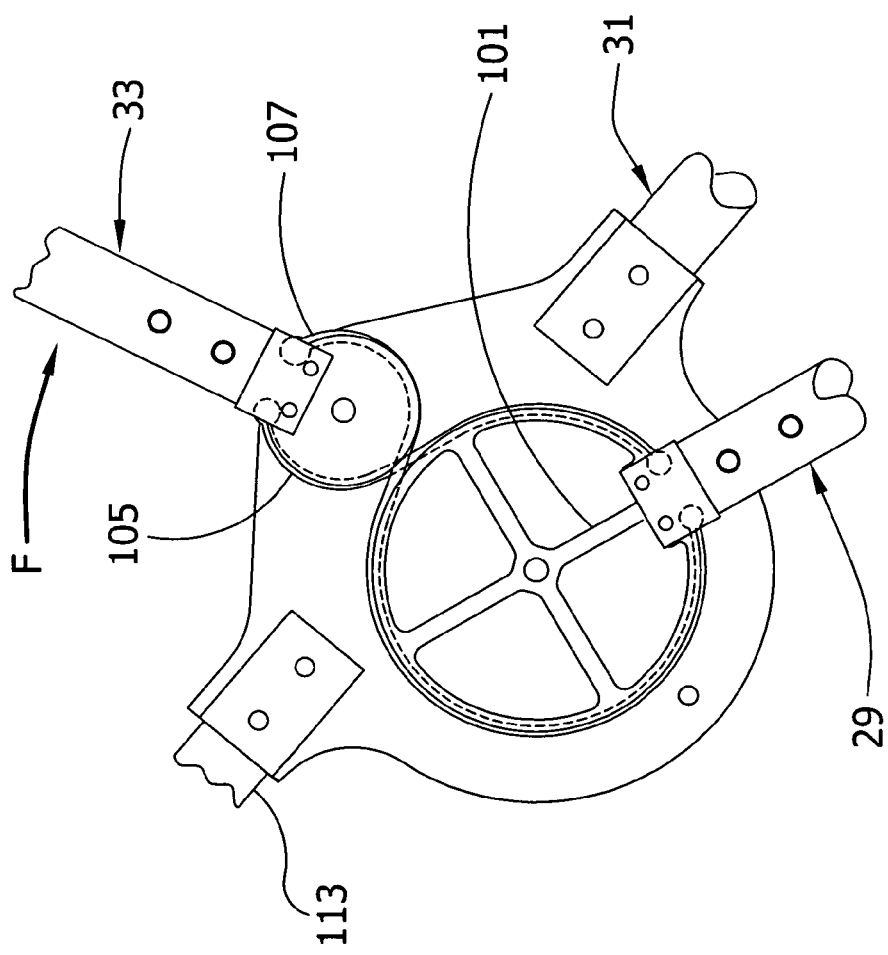

Referring to FIGS. 5 and 11–11A and describing only one side (the right side is shown) of the stroller 21, a first pulley 101 is fixed, as by rivets or other fasteners, to the upper end of the rear member leg 29. Similarly, a second pulley 102 is fixed to the lower end of the handle member 33. The housing 35 contains the first and second pulleys 101, 102 and is fixed to the upper end of the forward member leg 31. The pulleys 101, 102 are rotatably attached to the housing 35 (as by rivets or other fasteners). The first pulley 101 has a significantly larger diameter than the second pulley 102. The relative difference in diameters is determined by the difference in the respective angular movements of the rear member 29 and handle member 33 from the deployed to the folded condition. In this embodiment, the rear member 29 moves about 60 degrees and the handle member 33 moves about 180 degrees resulting in a first pulley 101 (the larger) diameter of about 3.5 inches and a second pulley 102 diameter of about 1.3 inches. Typically, the ratio of relative movement and relative pulley diameters is at least 2:1, and in this embodiment is about 3:1.

Within each housing 35, a first cable 105 has a first end attached to the first pulley 101 at the rear member 29 (FIG. 11). In the unfolded condition, the first cable 105 is wrapped around the forward side of the first pulley 101 and around the rear side of the second pulley 102, the second end being attached to the rear side of the second pulley adjacent the handle member 33. A second cable 107 also has a first end attached to the first pulley 101 at the rear member 29. The second cable 107 is wrapped around the rear side of the first pulley 101 and the forward side of the second pulley 102, the second end of the second cable being attached to the second pulley adjacent the handle member 33.

In this embodiment, each pulley 101, 102 has two axially spaced-apart grooves 109 (FIG. 11A) for receiving the respective cables 105, 107. The larger first pulley 101 has the shape of a spoked wheel, rather than a solid wheel like the second pulley 102, to save weight. Both pulleys 101, 102 are suitably made of aluminum, and the cables 105, 107 are suitably made of stretch-resistant material, such as steel. In this embodiment, at least the outside portion of the housing 35 is transparent to allow the user to see the cable/pulley arrangement, but the housing may be opaque within the scope of this invention. Operation of this cable/pulley arrangement will be further described below.

Figure 10:
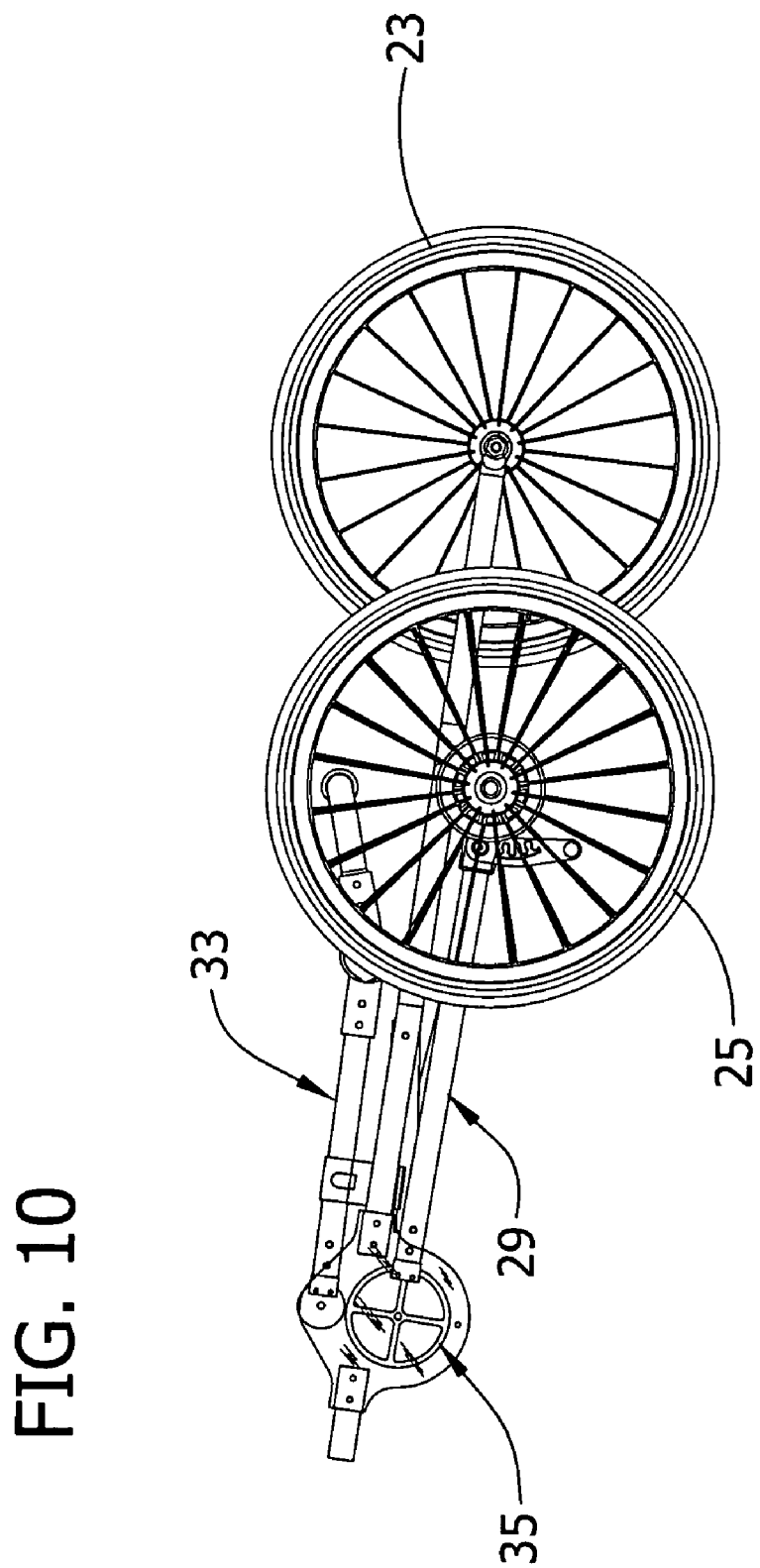

Referring to FIGS. 3 and 5, the frame 27 also comprises a short post 113 that extends upward and rearward from each housing 35 and is disposed below and parallel to the handle member 33. A handle lock 115 is rotatably mounted on the handle member 33. The handle lock 115 includes an opening sized to receive the post 113 to lock the handle member 33 relative to the post and thereby lock the stroller frame 27 in the unfolded position. As shown in FIG. 10, the opening may also receive the forward member 31 when in the folded position to thereby lock the stroller 21 in the folded position. Alternatively, the stroller 21 may include other fasteners or locks to lock the stroller in the folded position.

The wheels are conventional spoked wheels measuring between about 12 inches and about 20 inches, e.g. about 16 inches, in diameter and each having a pneumatic tire mounted thereon. It is contemplated that other types of tires and wheels may be used.

The handle member 33, rear member 29, and forward member 31 are suitably constructed of strong and lightweight material, such as aluminum or steel tubing. The tubing shown has a circular cross-section, though other cross-sections are contemplated. The side brace is made of aluminum bar stock and the housing is suitably made of transparent plastic, though other materials are contemplated. These frame elements can be unitary or made up of several pieces.

It will also be understood that many other features not shown in this embodiment may be added. For example, a restraint system may extend from the seat for securing the child therein, such as a 5-point harness. A fabric storage bin may be suspended beneath the seat. A "bicycle-type" brake system may be added, such as a conventional system including a lever attached to the handle connected by a cable to a caliper brake on the front wheel.

Figure 6:
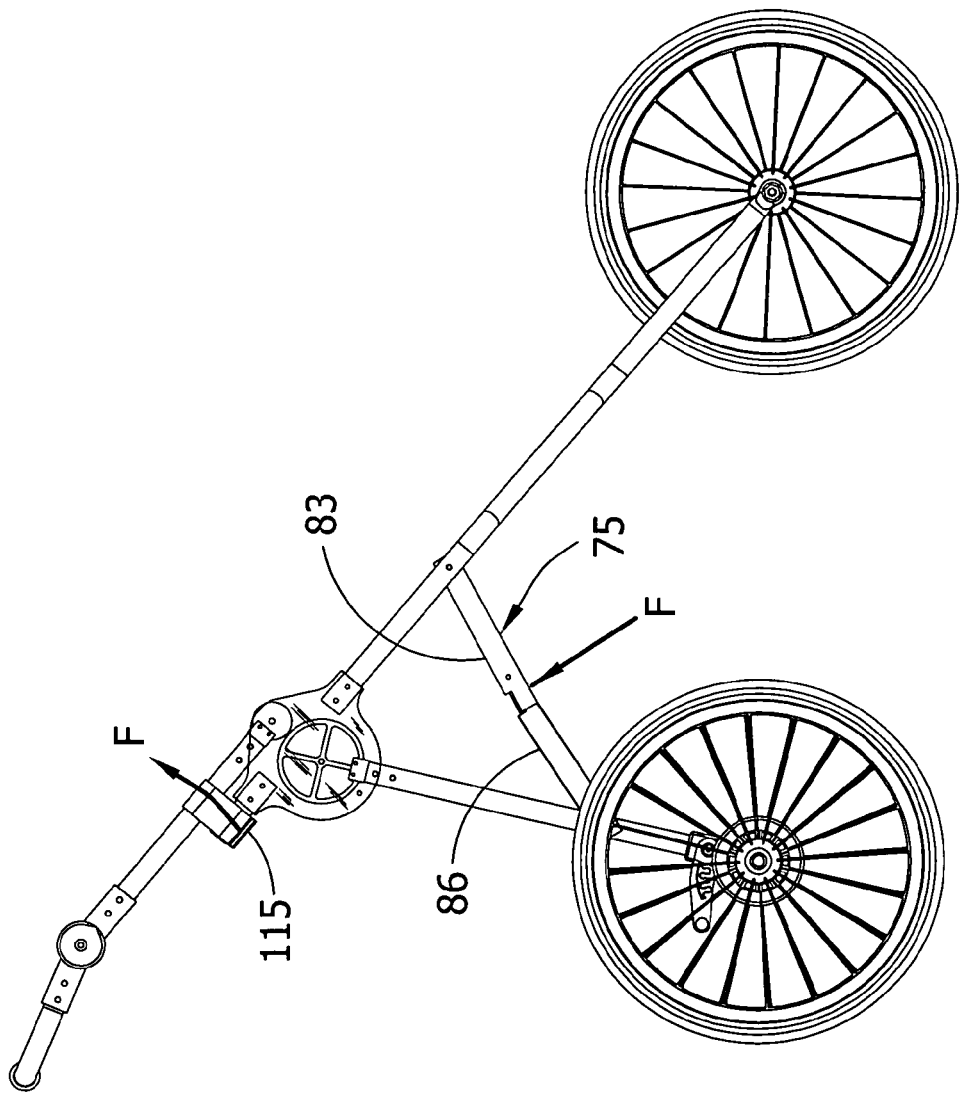
FIG. 6 is a side view similar to FIG. 5 but showing the side brace and handle lock moved to the unlocked position.
Figure 7:
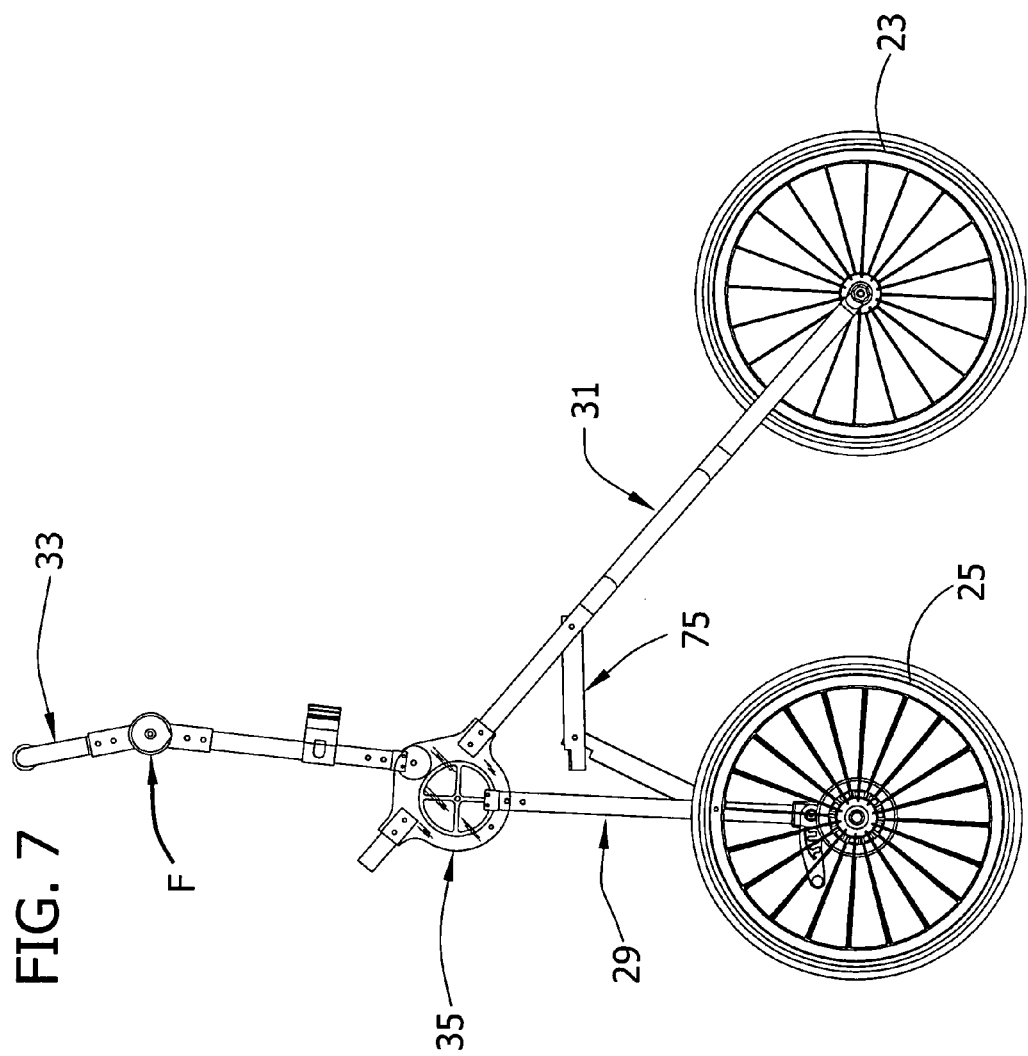
FIGS. 7–10 are a progression of side views showing the stroller moving to the folded position.
Figure 8:
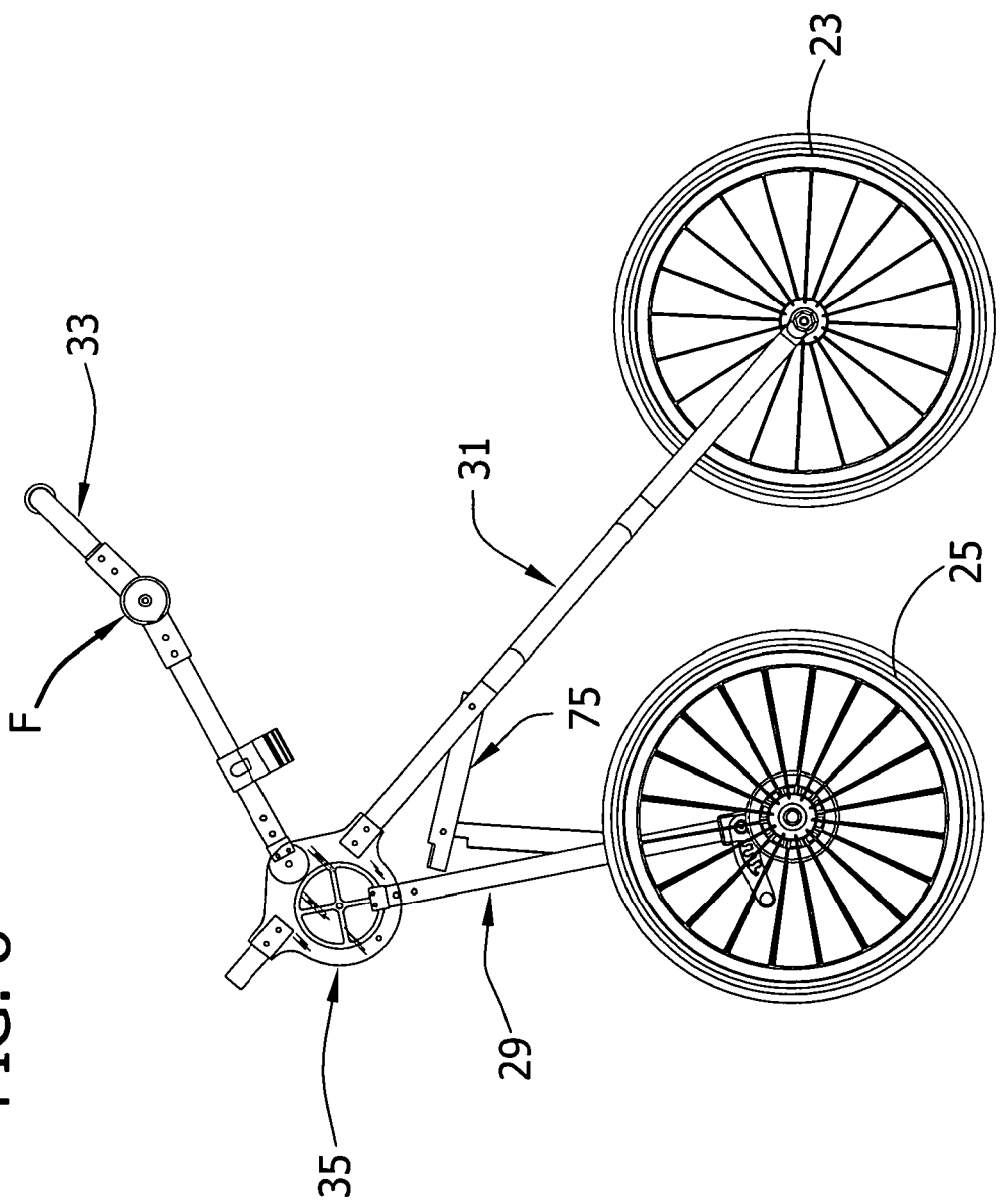
Figure 9:
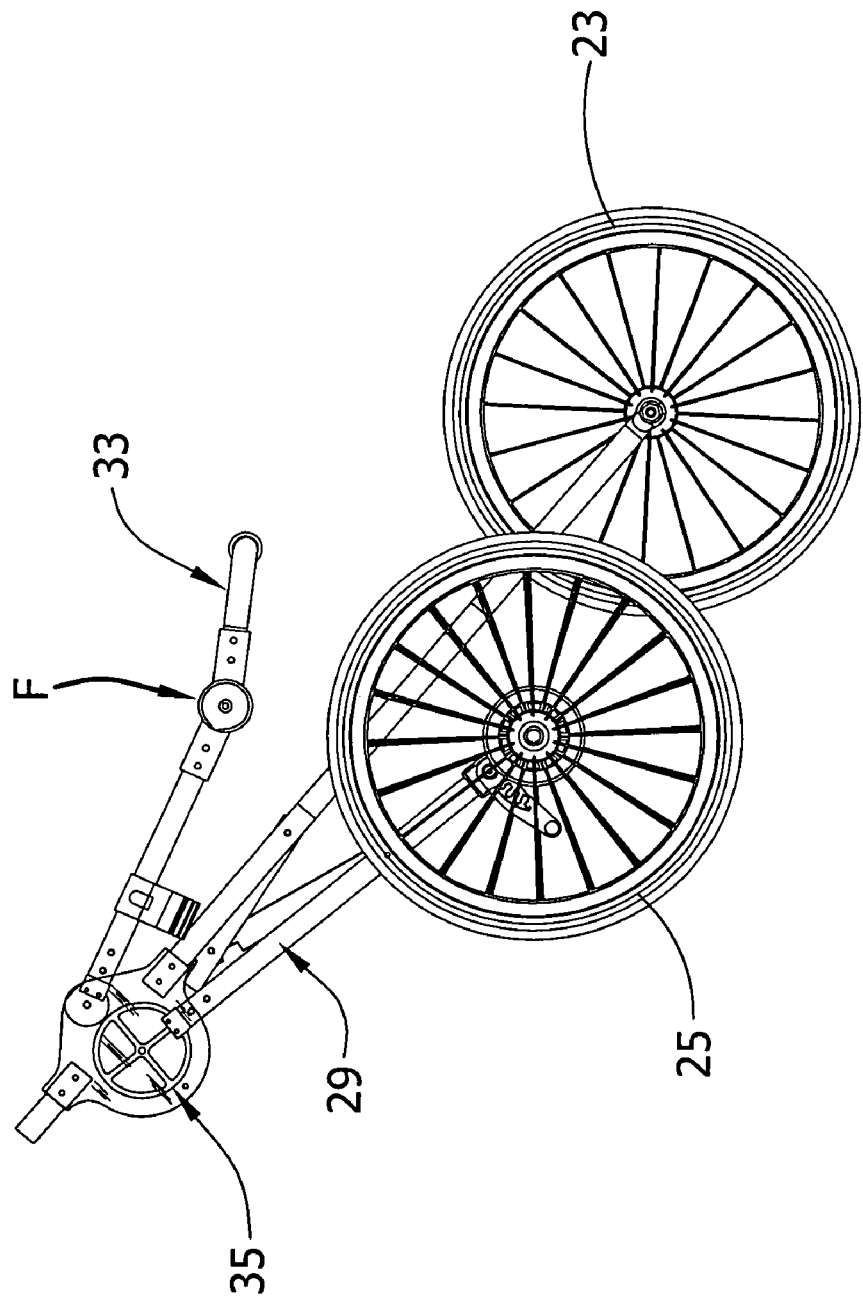

FIGS. 6–13 show a sequence of folding the stroller 21. In FIG. 6, the brace 75 is pushed up at either (or both) of the connections between the rear element 85 and the C-shaped element (in one embodiment, only one side need be pushed up), and the handle lock 115 is rotated out of engagement with the post 113. As shown in FIG. 7, the handle member 33 is then pushed forward. The movement of the handle member 33 causes the first cable 105 (FIG. 12) to rotate the first pulley 101 to thereby cause simultaneous counterclockwise rotation (as viewed in FIG. 12) of the rear member 29 toward the forward member 31. Note the second cable 107 is slack during this movement. The handle member 33 is pushed forward (FIGS. 8–9) until the frame 27 is in the folded condition shown in FIGS. 10 and 13. The forward member 31 is fixed relative to the housing 35 so it is not rotated during folding/unfolding. In the folded condition, the single front wheel 23 lies between the two rear wheels 25, as shown. The frame 27 may be locked in the folded condition as noted above. To unfold the stroller 21, the handle member 33 is pulled rearward (FIG. 14), which causes the second cable 107 to pull on the first pulley 101 and thereby cause simultaneous clockwise rotational motion of the rear member 29 away from the forward member 31.

As can be seen, folding and unfolding of the stroller 21 is performed quickly and easily. After releasing the safety locks (the handle lock 115 and the brace 75), the user need only push the handle 91 forward to fold the stroller. Likewise, to unfold the stroller 21, the user need only pull the handle 91 rearward. The stroller 21 is easily locked in the deployed condition by locking the brace 75, e.g., by pushing the brace over-center to the locked position and by engaging the handle lock 115. The stroller 21 is easy to use, but also includes redundant safety mechanisms so that the stroller will not inadvertently move from the deployed condition toward the folded condition.

As various changes could be made in the above constructions without departing from the scope of the invention, it is intended that all matter contained in the above description or shown in the accompanying drawings shall be interpreted as illustrative and not in a limiting sense. For example, the cables 105, 107 and pulleys 101, 102 may alternatively be arranged such that motion of the handle member 33 toward the folded position causes motion of the forward member 31. Also, the two cable arrangement herein may be replaced by a single cable. Additionally, the term "cable" is defined to include many flexible members, including rope, wire, chains, etc.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A three-wheeled jogging stroller movable between a deployed condition for transporting a child and a folded condition for compact storage of the stroller, the stroller comprising:
    a single front wheel and two rear wheels;
    a forward member having two spaced-apart legs and including a fork rotatably mounting the front wheel,
    a rear member having two spaced-apart legs, a lower end of each leg including two spaced-apart lower mounts for rotatably mounting the two rear wheels,
    a handle member extending upward and rearward from adjacent the upper end of the forward member, the handle member being rotatable to move the stroller from the deployed condition to the folded condition and back again,
    a flexible seat secured over at least one of the handle member and the forward member,
    an over-center, locking side brace extending between the respective legs of the rear member and the forward member and movable between a locked position for locking and stabilizing the stroller in the deployed condition and an unlocked position for allowing motion of the stroller from the deployed condition to the folded condition,
    first and second pulleys, each pulley being attached to one of the forward member, rear member and handle member,
    first and second cables, each cable being wrapped partially around and attached to at least one of the pulleys,
    the pulleys and cables arranged to cause motion toward the folded position of at least one of the forward and rear members upon rotation of the handle member in a first direction toward the folded position so that the stroller moves from the deployed condition to the folded condition by forward rotation of the handle member,
    the pulleys and cables further arranged to cause motion toward the deployed position of at least one of the forward and rear members upon rotation of the handle member in a second direction toward the deployed position so that the stroller moves from the folded condition to the deployed condition by rotation of the handle member,
    the brace including left and right rear elements connected to the rear member, and including a C-shaped element that is pivotally connected to the forward member so that a central section of the C-shaped element extends laterally between the legs of the forward member under the seat area.

2. The stroller of claim 1 further comprising a second lock pivotably secured to the handle member for locking the stroller in the deployed condition, the side brace and second lock both operable to lock the stroller in the deployed condition.

3. The stroller of claim 2 further comprising a post adjacent the handle member in the deployed condition, the second lock having an opening therein for receiving the post to lock the stroller.

4. The stroller of claim 2 wherein the brace is pivotable from the locked position to the unlocked position from both sides of the stroller.

5. The stroller of claim 4 wherein the brace is pivotable at connections between the rear element and the C-shaped element.

6. The stroller of claim 5 wherein forward movement of the handle member toward the folded condition causes the first cable to rotate the first pulley and thereby cause simultaneous rotational motion of the rear member toward the forward member.

7. The stroller of claim 6 wherein rearward movement of the handle member toward the deployed condition causes the second cable to rotate the first pulley and thereby cause simultaneous rotational motion of the rear member away from the forward member.

8. The stroller of claim 7 further comprising left and right side housings, each of which encloses a set of the first and second pulleys and cables.

9. The stroller of claim 8 wherein the two legs of the forward member are fixed to respective housings.

10. The stroller of claim 1 wherein an upper portion of the handle member is adjustable relative to a lower portion of the handle member.

11. The stroller of claim 1 wherein the rear member is U-shaped, and wherein each of the lower mounts for the rear wheels includes a bearing.

12. The stroller of claim 11 further comprising rear wheel hubs on each rear wheel, each hub including teeth interengageable with a pivotable brake mounted on the rear member so that the rear wheel can be locked.

13. The stroller of claim 12 wherein the rear wheels include axles removably received in the bearings of the rear member for more compact storage of the stroller.

14. The stroller of claim 1 wherein the first pulley has a diameter at least 2 times greater than a diameter of the second pulley.

15. A three-wheeled jogging stroller movable between a deployed condition for transporting a child and a folded condition for compact storage of the stroller, the stroller comprising:
   a single front wheel and two rear wheels;
   a seat made of flexible material,
   a frame mounting the wheels and seat, the frame including:
      a right side housing and a left side housing,
      a forward member having spaced-apart legs fixed to each of the housings at an upper end and rotatably mounting the front wheel at an opposite end,
      a rear member including first pulleys at right and left upper ends rotatably connected to respective housings and the rear member including spaced-apart lower mounts at right and left lower ends for rotatably mounting the two rear wheels,
      a handle member including second pulleys at right and left lower ends rotatably connected to respective housings, the handle member being rotatable about the housing to move the stroller from the deployed condition to the folded condition,
      first and second cables, each cable being wrapped partially around and attached to at least one of the pulleys,
      an over-center locking side brace extending between the rear member and the forward member and movable between a locked position for locking and strengthening the stroller in the deployed condition and an unlocked position for allowing motion of the stroller from the deployed condition to the folded condition,
      the brace including a rigid beam extending laterally between the legs of the forward member,
      the pulleys and cables arranged to cause motion of the rear member upon rotation of the handle member toward the folded position so that the stroller moves from the deployed condition to the folded condition by forward rotation of the handle member,
      the pulleys and cables further arranged to cause motion toward the deployed position of the rear member upon rotation of the handle member toward the deployed position so that the stroller moves from the folded condition to the deployed condition by rotation of the handle member.

16. The stroller of claim 15 wherein the housing is transparent.

17. The stroller of claim 15 wherein the locking side brace locks in an over-center position.

18. The stroller of claim 15 further comprising a second lock for locking the frame in the deployed condition.

19. The stroller of claim 1 wherein the C-shaped element includes arms extending rearward from the central section generally at 90° angles, each arm being pivotally connected to one of the left and right rear elements to form hinges of the over-center, locking side brace.

* * * * *